United States Patent
Rogers

(10) Patent No.: US 7,734,714 B2
(45) Date of Patent: Jun. 8, 2010

(54) SPATIAL SIEVE TREE

(75) Inventor: J. Andrew Rogers, San Jose, CA (US)

(73) Assignee: SpaceCurve, Inc., Palo Alto, CA (US)

( * ) Notice: Subject to any disclaimer, the term of this patent is extended or adjusted under 35 U.S.C. 154(b) by 203 days.

(21) Appl. No.: 12/013,385

(22) Filed: Jan. 11, 2008

(65) Prior Publication Data

US 2009/0182837 A1 Jul. 16, 2009

(51) Int. Cl.
*G06F 15/167* (2006.01)
(52) U.S. Cl. .................. 709/215; 709/224; 707/101; 707/103 X
(58) Field of Classification Search .......... 709/215, 709/220, 223, 200, 224; 707/103 X, 101, 707/3
See application file for complete search history.

(56) References Cited

U.S. PATENT DOCUMENTS

| 5,963,956 A * | 10/1999 | Smartt ................ 707/104.1 |
| 2006/0053163 A1* | 3/2006 | Liu et al. ............. 707/104.1 |
| 2006/0111126 A1* | 5/2006 | Chithambaram ......... 455/456.5 |
| 2006/0184519 A1 | 8/2006 | Smartt |
| 2007/0133592 A1* | 6/2007 | Zheng et al. ............. 370/458 |
| 2007/0174309 A1* | 7/2007 | Pettovello ............... 707/100 |
| 2008/0040384 A1* | 2/2008 | Kuznetsov ............. 707/103 Y |
| 2008/0181118 A1* | 7/2008 | Sharma et al. ............. 370/238 |
| 2008/0195584 A1* | 8/2008 | Nath et al. ................. 707/3 |

OTHER PUBLICATIONS

Oliver Günther et al., "Spatial Database Indices for Large Extended Objects", IEEE, 1991, pp. 520-526.
Beng Chin OOI, et al., "Spatial kd-Tree: An Indexing Mechanism for Spatial Database", IEEE, 1987, pp. 433-438.
International Search Report and Written Opinion of the International Searching Authority for counterpart application No. PCT/US2009/030677, mailed on Apr. 15, 2009, 14 pages.
Volker Gaede et al., "Multidimensional Access Methods", AMC Computing Surveys, vol. 30, No. 2, Jun. 1998, pp. 170-231.

* cited by examiner

*Primary Examiner*—Philip B Tran
(74) *Attorney, Agent, or Firm*—Blakely, Sokoloff, Taylor & Zafman LLP; Ryan W. Elliott

(57) ABSTRACT

A method, apparatus, and system is described for creating a spatial sieve tree which stores, manages, and manipulates multidimensional data by partitioning the bounds of the nodes of the tree, creating child nodes which each have defined bounds associated with a partitioned portion of their parent node(s) and may be further partitioned into additional levels of child nodes, and determining which level of the tree has the smallest size node in which a data object could wholly fit regardless of the data object's location in coordinate space and the one or more nodes of that determined level that could at least partially contain the data object based on the bounds of the one or more nodes and the data object's location in coordinate space.

22 Claims, 9 Drawing Sheets

SPATIAL SIEVE TREE

FIELD

Embodiments of the present invention relate generally to the field of computers. More particularly, these embodiments relate to products, systems and methods for a spatial sieve tree to store, manage, and manipulate spatial and multidimensional data.

BACKGROUND

A tree is a common way of storing data in a computer so that the data cm be used efficiently. A well-designed tree allows a variety of operations to be performed while using as few resources as possible: namely the amount of time it takes to execute an operation and the required memory space. A tree, like a family tree, is so named because a physical representation of it looks like a tree, even though the tree is generally shown upside down compared with a real tree; with the root at the top and the leaves at the bottom.

A tree utilizes a set of linked "nodes" to store the data. A node may contain one or more data objects, a condition, and/or represent a separate tree of its own. Each node in a tree has zero or more "child" nodes, which are nodes connected to it and below it in the tree. A node that has a child is referred to as the child's "parent" node. A node has at most one parent. The topmost node in a tree is called the "root" node. Nodes at the bottommost level of the tree are called "leaf" nodes. Nodes in between the root and leaves are called internal nodes or referred to simply as child nodes and referenced by their level (like generations in a family tree, counting from either the root or the leaves).

FIG. 1A shows a graphical representation of a simple tree. At the uppermost position is root node 102. Root node 102 contains data "D" and has two child nodes, nodes 104 and 106, which respectively contain data "B" and "F." In this example, child nodes 104 and 106 make up the first level of child nodes (the first level below the root node). Node 104 has two child nodes 108 and 110, which respectively contain data "A" and "C." Thus node 104 is the child node of root node 102 and the parent node of child nodes 108 and 110. Similarly, node 106 has two child nodes 112 and 114, which respectively contain data "E" and "G." Nodes 108, 110, 112, and 114 make up the second level of child nodes.

FIG. 1B shows a graphical representation of the tree implemented as an array a list of indexed elements. The representation of an array in FIG. 1B makes the visual relationships between data a little more difficult to grasp than the tree in FIG. 1A, but it serves as better visual example of how the tree can be implemented in the context of storing the data in memory. In this example, each element 120-132 is equivalent to a node in the tree of FIG. 1A. By using an indexed list, each element can contain the data for each node as well as "pointers" to its child nodes. The pointers are the address/index of the child nodes so the list may be accessed following the tree structure rather than only sequentially from left to right.

Root node 102 is now stored in array element 120 which uses the index "0." Element 120 contains the data "D" for the root node as well as pointers to the first level child nodes 104 and 106 which are represented as elements 122 and 124. The pointer from element 120 (root node) to element 124 (child node) allows a computer to skip past element 122 and go directly to element 124, using its index "2," when traversing the tree, shown in FIG. 1A, to the right. Similarly, node 106 is stored in array element 124 which contains data "F" and has pointers to element 130 with index "5" and element 132 with index "6."

In order to retrieve data "G" from a tree without knowing its exact location, a computer can start at the root node 102, traverse to the child node on the right 106, and again to another child node on the right 114. In terms of the array, element 120 will point to the index for element 124, and element 124 will point to the index for element 132. At most, any data will be two steps away from the root node in this tree. If the list in the array was searched sequentially from left to right, it would take six steps to reach "G." As the amount of data grows, so do the savings in steps and thus computational time.

A common type of tree structure is a "B-tree." The format of data within B-tree is based upon a global order, restraints on the amount of data in each node, and the amount of child nodes each parent may have. B-trees are also required to remain balanced: all of the leaf nodes are on the same level. FIG. 1A shows a simplified version of a B-tree. The global order for FIG. 1A's B-tree is alphabetic order. The leftmost node contains "A" and as you move right, the data progresses alphabetically to "G" in the rightmost node. Each parent node lies between (contains a median value of) its child nodes in terms of the global order: parent node 104 contains "B" which comes after "A" in child node 108 on the left and before "C" in child node 110 on the right. The tree in FIG. 1A is also balanced: all leaf nodes 108, 110, 112, and 114 are on the second level of child nodes.

B-trees also operate under the assumption that there is a meaningful separation between data objects. Letters of the alphabet each have their own distinct value and are easily separated from one another. In the example above of searching the tree in FIG. 1A for "G" without knowing its location, a separation between each letter is required. Starting again at the root node 102, "D" is found. If the global order is alphabetic order, letters that come before "D" are going to be found in child nodes to the left and letters that come after "D" are going to be found m child nodes to the right, "G" comes after F, so we traverse to the right child node 106, where "F" is found. Again, letters before "F" will be to the left and letters after "F" will be to the right. Finally, we traverse to the child node 114 an the right, and "G" is found.

Considerable study and research has been expended in the design of systems to store, manage, and manipulate multidimensional/spatial data (hereinafter "spatial data"). Spatial data is a naturally occurring feature of numerous application spaces, and since it frequently involves extremely large datasets, index-based access methods for spatial data have been extensively studied. Despite this research, the trees and other methods for manipulating data in common use exhibit poor scalability across a wide range of environments, thereby limiting applicability to relatively narrow problem spaces.

Classic B-tree data structures owe much of their scalability to the assumption that there is a meaningful global order to the dataset in a single dimension and that a natural partition exists between any arbitrary set of records such that it is trivial to distribute the records across the nodes of the tree while preserving the global order. A problematic feature of many spatial datasets is that there may be no natural partitions between records, the probability of which increases as the number of records increases. Furthermore, multidimensional spatial datasets tend to be very resistant to the notion of having a global order in a single dimension. Numerous proposals for globally ordering spatial data for the purposes of storing it in B-tree data structures have been made, none of which generalize well in practice due to the necessary semantic lossiness of dimension reduction. Consequently, current spatial data structures tend to preserve the dimensionality of the data in their representations to preserve generality, but do so using strategies that adversely effect scalability.

The primary strategy used for indexing spatial data is that typified by the R-tree and its derivatives. R-trees split coordinate space with hierarchically nested, overlapping bounding rectangles. Each non-leaf node within the tree has a variable number of entries, up to some pre-defined limit. Each entry represents a way to identify a child node and a bounding rectangle that contains all of entries within that child node. The actual data objects (or pointers to them) are stored in leaf nodes along with the bounding boxes for those data objects.

Unlike B-trees, where logically adjacent nodes never overlap, R-trees solve the problem of a spatial dataset having no natural partitions by allowing logically adjacent nodes in the tree to contain overlapping data. If a spatial data record straddles the bounds of two nodes, one of the two nodes is selected and adjusted so that the node's bounds logically contain that data object. As a natural consequence, the bounds of the two nodes that the spatial data, overlapped now overlap each other.

FIGS. 2A and 2B show graphical representations of sample spatial data objects and their organization within a simple R-tree. In this example, each node of the R-tree in FIG. 2B, 250-262, may contain up to three entries. Bounding rectangles 202 and 204 are the highest in the hierarchy and the combination of bounding rectangles 202 and 204 contain all of the bounding rectangles and data, thus they are stored in root node 250. Entry 202 within root node 250 contains a way to identify a child node 252 and the bounding rectangle 202 shown in FIG. 2A which contains the entries of child node 252: 206 and 208. Entry 204 within root node 250 contains a way to identify a child node 254 and the bounding rectangle 204 shown in FIG. 2A which contains the entries of child node 254; 210 and 212. Entry 206 within node 252 contains a way to identify a child node 256 and the bounding rectangle 206 shown in FIG. 2A which contains the entries of child node 256; 214 and 216. This structure continues in this manner throughout the first level of child nodes. The second level of child nodes, 256-262 all contain the actual data objects and their respective bounding rectangles 214-230.

While this strategy works reasonably well for handling arbitrary sets of spatial objects, it has multiple significant scalability drawbacks. First, searching the tree for a single object may require traversing multiple branches of the tree in eases where nodes overlap, and the probability of node overlap increases as datasets grow larger. Second, the amount of CPU time required to service a query is very sensitive to the size distribution of spatial data records in the indexed spatial data set; a small number of atypically large geometries can substantially increase the number of geometries that must be evaluated when servicing art average query. Third, update concurrency and write scalability tend to be relatively poor because logically adjacent nodes can overlap with independently variable bounds. When an object is added to, deleted from, or modified within a tree it will affect the size of the bounding rectangles and the structure of the tree as each node is limited to a predetermined amount of entries. For example, in FIGS. 2A and 2B, if a data object was inserted within bounding rectangle 210, data in leaf node 260 would need to be rearranged as leaf node 260 already contains the maximum amount of entries. An update of this type will require propagating the changes through the tree which can "lock" other updates out of large portions of the tree. This both prevents high-concurrency update techniques common in B-trees (e.g., Lehman/Yao B-trees) and can potentially cause excessive locking in the upper nodes of the tree structure as node bounds are modified. Despite these limitations on scalability, R-tree based algorithms are the most common general-purpose indexed access methods for spatial data in use.

Another important strategy used for indexing spatial data is that typified by the Quad-tree algorithm. Quad-trees are most often used to partition two-dimensional space by recursively subdividing it into four quadrants or regions, decomposing coordinate space into smaller "buckets." Each bucket has a maximum capacity and when capacity is reached, the bucket is partitioned again. Like the R-tree, leaf nodes contain the actual data objects while each internal node only contains its defined bounds and a way to identify child nodes that represent partitions of its bounds. Unlike the R-tree, Quad-trees preserve the strict logical adjacency of individual nodes in the tree by recursively partitioning the coordinate space into ever-smaller nodes as they become full and replicating spatial data records across every node they logically intersect.

FIGS. 3A and 3B show graphical representations of sample spatial data objects (similar to FIG. 2A) and their organization within a simple Quad-tree. Bounding rectangle 300 of FIG. 3A contains the entire coordinate space and thus as the root node 300 in FIG. 3B. In this example, the limit on data objects bounded per rectangle/node is three. As there are more than three data objects within the bounds of 300, it is partitioned into four bounding rectangles 302, 304, 306, and 308. Bounding rectangle 308 contains (at least partially) more than three data objects (324, 328, 330, 332, and 334), so it too is partitioned into four bounding rectangles 310, 312, 314, and 316.

In FIG. 3B, root node 300 and internal node 308 contain their respective bounding boxes and pointers to (or other identification of) their respective child nodes/partitioned quadrants. Leaf nodes 302, 304, 306, 310, 312, 314, and 316 all contain their bounding boxes and the actual data contained (wholly or partially) by those bounds. Data object 322 is an example of data that overlaps the partition and is partially contained by two leaf nodes. As a result, a copy of data object 322 is copied into both nodes 302 and 306. Similarly, data object 332 straddles two partitions and is partially contained by bounding rectangles 310, 312, 314, and 316: thus a copy of data object 332 is stored in each of nodes 310, 312, 314, and 316.

While trees that use a replication strategy, such as Quad-trees, tend to have moderately good update concurrency and a CPU efficiency that is much closer to the performance of a B-tree than a R-tree, the potential for replicating single spatial data records across very large numbers of nodes as the dataset grows larger is so pathological that it is generally considered a very poor choice for indexing non-point geometries. The pathological replication of data objects can be seen in relation to FIGS. 3A and 3B. The addition of only a few more data objects in bounding box 308 would require bounding boxes 310-316 to each be partitioned. While still dealing with a small dataset, data object 332 would be copied into eight different nodes. As a consequence of this pathological replication, Quad-trees (and similar trees that replicate overlapping data) are used almost exclusively for the narrow case of geometry datasets that are guaranteed to never require replication; e.g., data composed entirely of points, such as raster graphics.

Almost all current spatial indexing methods can be categorized as a derivative of one of these two basic strategies, and share a number of features such as the utilization of a balanced tree structures and the focus on position in the coordinate space as the sole organizing feature. Some recently proposed methods attempt to mitigate the impact of large geometries on the performance of spatial data structures, both for R-trees and Quad-tree variants (see Hanan Samet, *ACM Computing Surveys* (*CSUR*), Volume 36, Issue 2 (June 2004) pages 159-217), but with primary result being better multi-resolution feature extraction rather than improved general scalability.

BRIEF DESCRIPTION OF DRAWINGS

The present invention is illustrated by way of example and not limitation in the figures of the accompanying drawings, in which like references indicate similar elements, and in which.

DETAILED DESCRIPTION

Figure 1A:
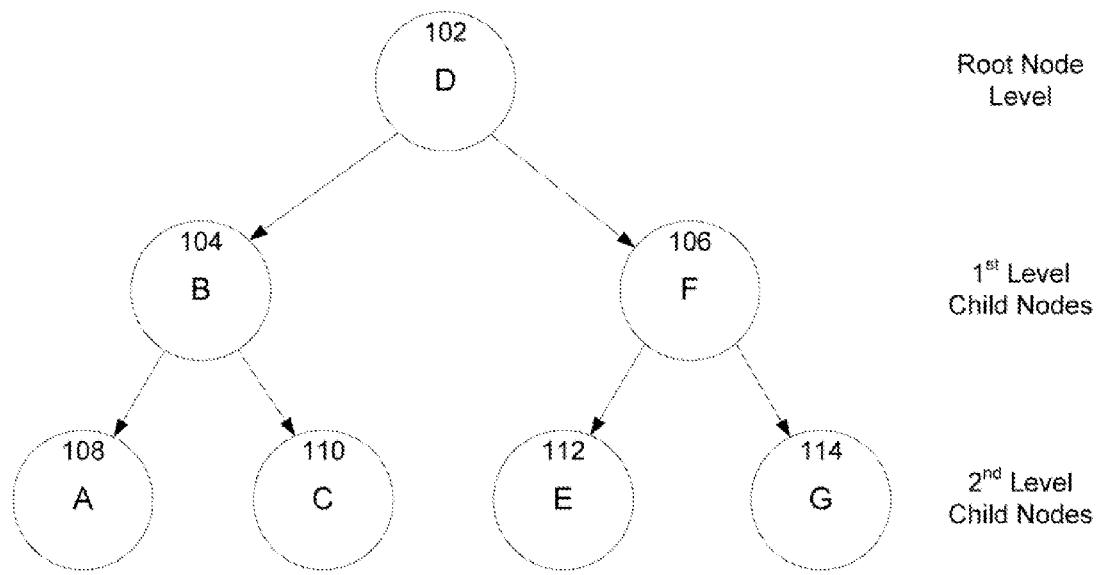
FIG. 1A shows a simple B-tree.
Figure 1B:
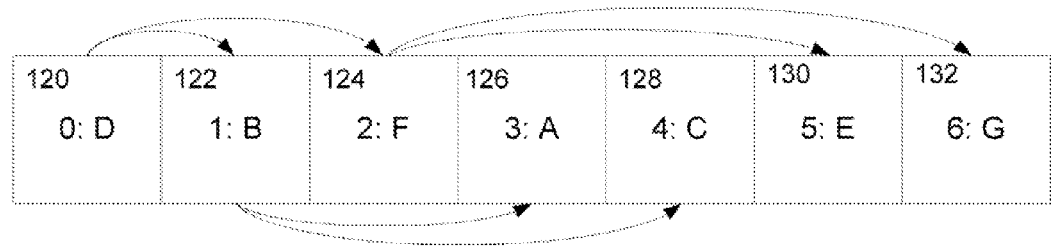
FIG. 1B shows a simple B-tree implemented as an array.
Figure 2A:
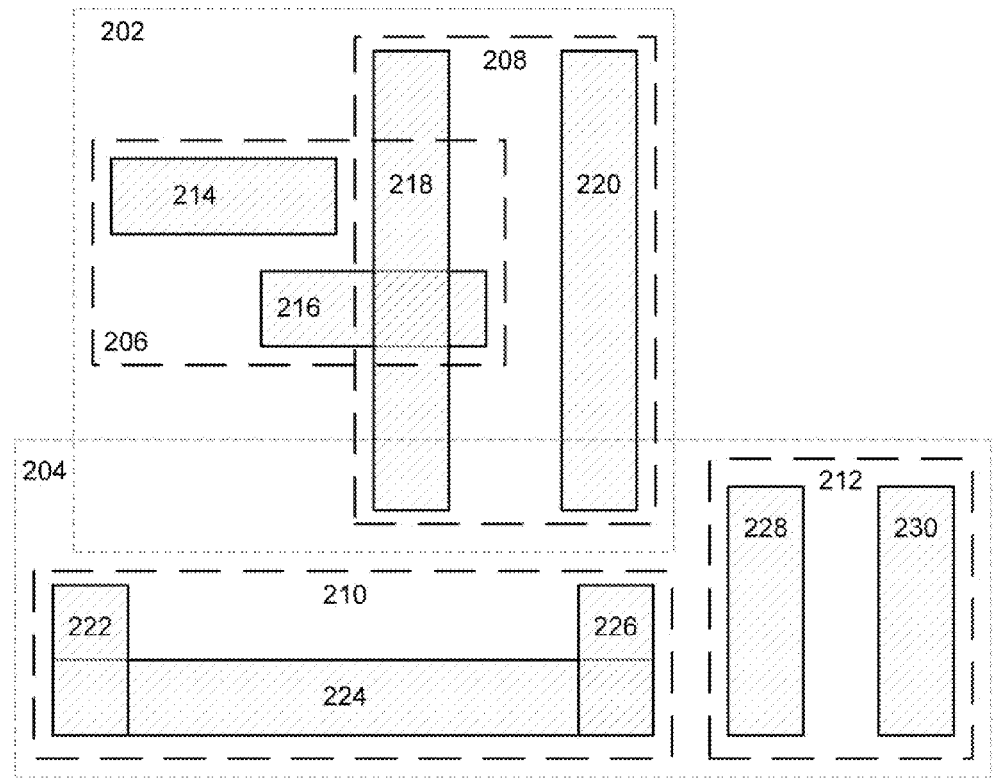
FIG. 2A shows a sample spatial data objects and bounding rectangles for organization within a simple R-tree.
Figure 2B:
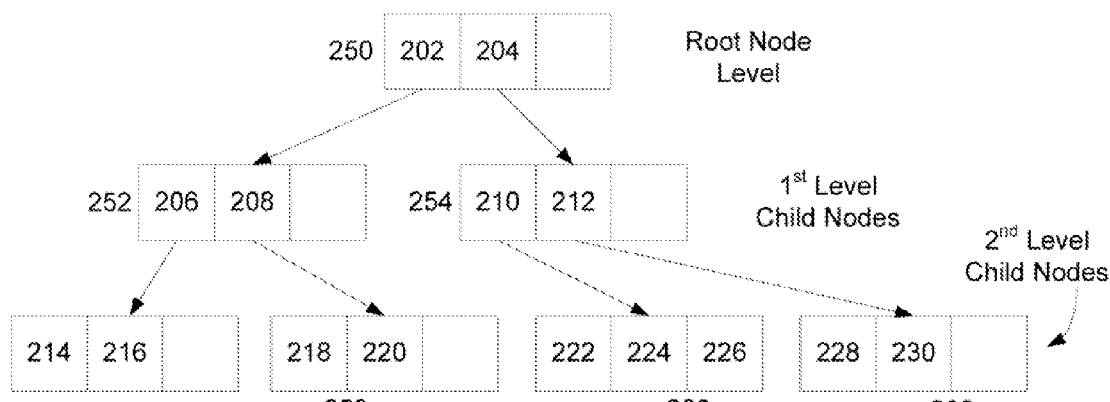
FIG. 2B shows a simple R-tree containing the sample spatial data objects based upon the bounding rectangles.
Figure 3A:
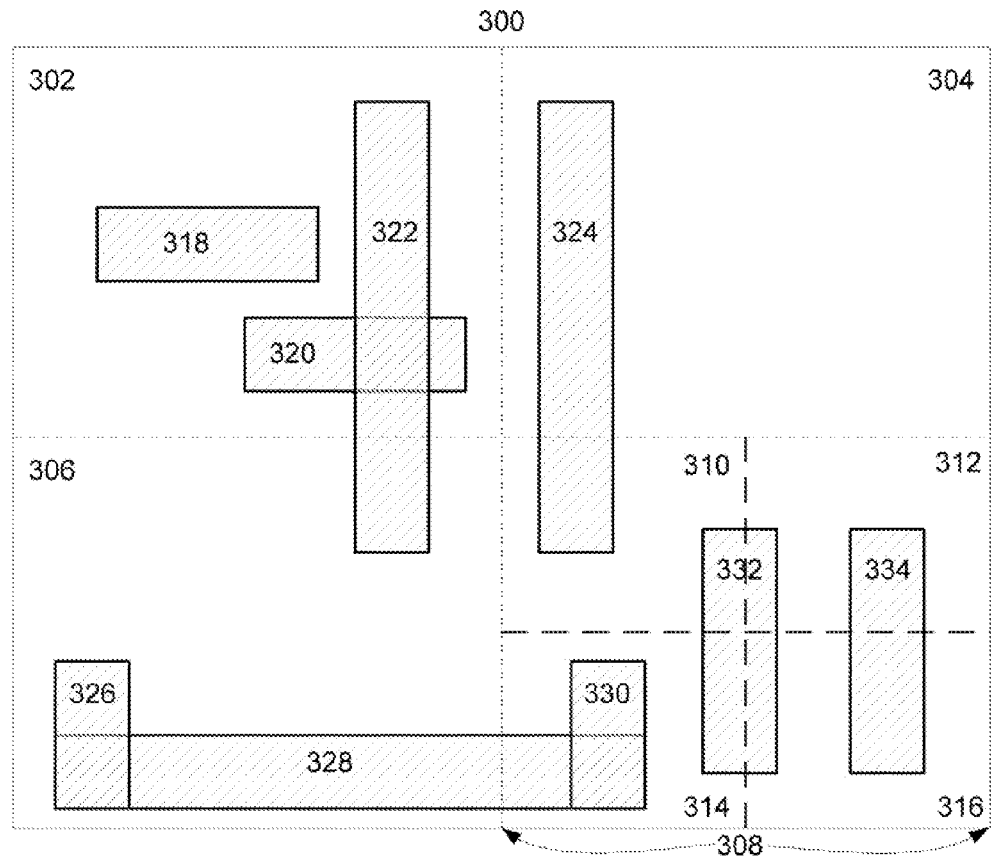
FIG. 3A shows a sample spatial data objects and bounding rectangles for organization within a simple Quad-tree.
Figure 3B:
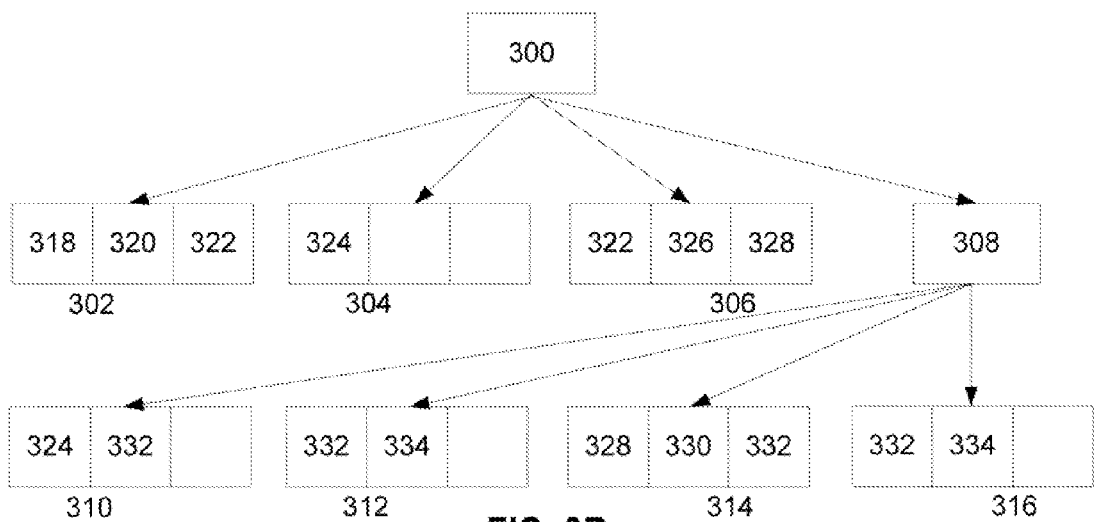
FIG. 3B shows a simple Quad-tree containing the sample spatial data objects based upon the bounding rectangles.

In the following description, numerous specific details are set forth. However, it is understood that embodiments of the invention may be practiced without these specific details. In other instances, well-known circuits, structures and techniques have not been shown in detail in order not to obscure the understanding of this description. For example, it is understood by one of ordinary skill in the art that saving data to a memory (non-volatile or volatile) location may alter the state of said location by changing one or more voltage levels at that location.

According to an embodiment of the invention, a sieve tree utilises a spatial indexing method based upon a replication-based, unbalanced tree that is organized via a "sieve" function that otherwise shares many features of the space-partitioning algorithm used in Quad-trees. Unlike both current major strategies (R-trees and Quad-trees), most operations on a sieve tree have a constant upper bound on complexity. Unlike all previous replication-based indexing strategies, a spatial sieve tree guarantees a constant upper bound on the number of spatial data replicas that exist in the data structure regardless of the size of the dataset or size distribution of spatial data records. Additionally, embodiments of the invention explicitly use geometry size as an organizing feature in the data structure. Importantly, scaling and performance characteristics are largely insensitive to the characteristics of the dataset or run-time access patterns. This remains true even when indexing extremely large datasets and generalizing a spatial sieve tree across datasets without regard for data characteristics. A sieve tree is practically scalable to extremely large datasets, and capable of supporting very high concurrent update rates. This has a large impact upon a range of applications including, but not limited to: organizing and searching geospatial data, e.g., using a mapping program to search an area for all locations of one business within a region, organizing and manipulating multidimensional financial data, creating "virtual worlds," as well as tracking cellular phone users for mobile advertising purposes.

According to an embodiment of the invention, a bounding object is a finite rectangle/hyper-rectangle with sides parallel to the coordinate axes of the space in which a geometry is embedded that also contains that geometry. A bounding object is trivially computable and is known informally as a "bounding box" in 2- and 3-dimensional spaces. In other embodiments, a bounding object, has sides that are not parallel to the coordinate axes or utilizes the shape of another polygon, or polyhedra. Intersection and containment tests are done using the bounding object of a referenced object unless otherwise specified.

A node is a logical storage area for a spatial data record and its associated geometry. A node has an associated immutable bounding object that is unique to that node. Nodes are logically organized in a simple tree structure. A node's bounding object does not overlap the bounding object of any other node in the tree within the same node level and is contained by the bounding object of its parent node. The number of geometries a node may store and the quantity of computer memory those geometries may occupy is not bounded. New tree nodes are created by a process of spawning child nodes from a parent node, not by splitting existing nodes, the latter behavior being a common characteristic for most other tree structures in use.

In one embodiment, there is an application dependent cost basis for determining when to spawn child nodes. Generally, child nodes are spawned when it would substantially reduce I/O or significantly improve the selectivity of queries, e.g., less data objects would need to be examined in a search and retrieve function. In one embodiment of the invention child nodes are spawned when a node contains some minimum number of records and there would be a distribution of records that would exhibit significantly improved selectivity by spawning child nodes. In another embodiment statistics are kept in leaf nodes as records are inserted and deleted as to how the geometries would distribute if child nodes were spawned. In a binary partitioning scheme, there would only be four possible states that would need to be counted: sieved, high-child, low-child, and both-children. From these statistics, it would be trivial to create a threshold function that reflects the costs of creating children in a given implementation.

In a simple B-tree, a split occurs when a node has reached its maximum entries and is accomplished by choosing a single median from among the node's elements and the new element. The node is split into two nodes. Elements with a value less than the median (according to the global order for the tree) are put in the new left node and values greater than the median are put in the new right node, with the median element acting as a separation value. The median element is added to the former node's parent with the two new nodes as its children. However, propagating the median element up the tree may cause the parent node to be split, and so on up the tree to the root node. If the splitting goes all the way up to the root, it creates a new root with a single separator value and two children. Each split requires "locking" the parent node in order to change it without interference from another operation. One insertion into a tree that, uses splitting can cause a large portion of the free structure to change, which can be time consuming as splits and leeks are completely propagated up the tree. One benefit to splitting is that it keeps the tree balanced.

In an embodiment of the invention, spawning child nodes is performed by partitioning the bounding object of a node into two or more bounding objects and creating a new node associated with each of those bounding objects, with the spawning node as their parent node. Spawning child nodes has many advantages over splitting nodes, particularly with respect to concurrent modification and access of the tree structure, and it creates no disadvantages that would not otherwise exist or which are not mitigated by some other mechanism (e.g., a spatial sieve tree does not have to he balanced). Spawning combined with an immutable bounding object offers a number of significant benefits related to sealing behavior: expanding a tree by spawning requires neither having nor acquiring a lock on the parent node, nor propagating lock acquisitions toward the root node; it mitigates or eliminates many concurrency-related issues that arise when multiple processes are accessing or modifying a single node simultaneously; individual nodes may be safely accessed with an array/multimap using a key derived from the bounding object of a node instead of recursing the tree.

The bounding object of the root node defines the extent of the entire coordinate space (similar to the root node of a Quad-tree) and therefore the bounding object of the root node must also contain all points contained by a geometry stored in the sieve tree. The coordinate space must be finite because a bounding object is finite by definition.

Figure 4:
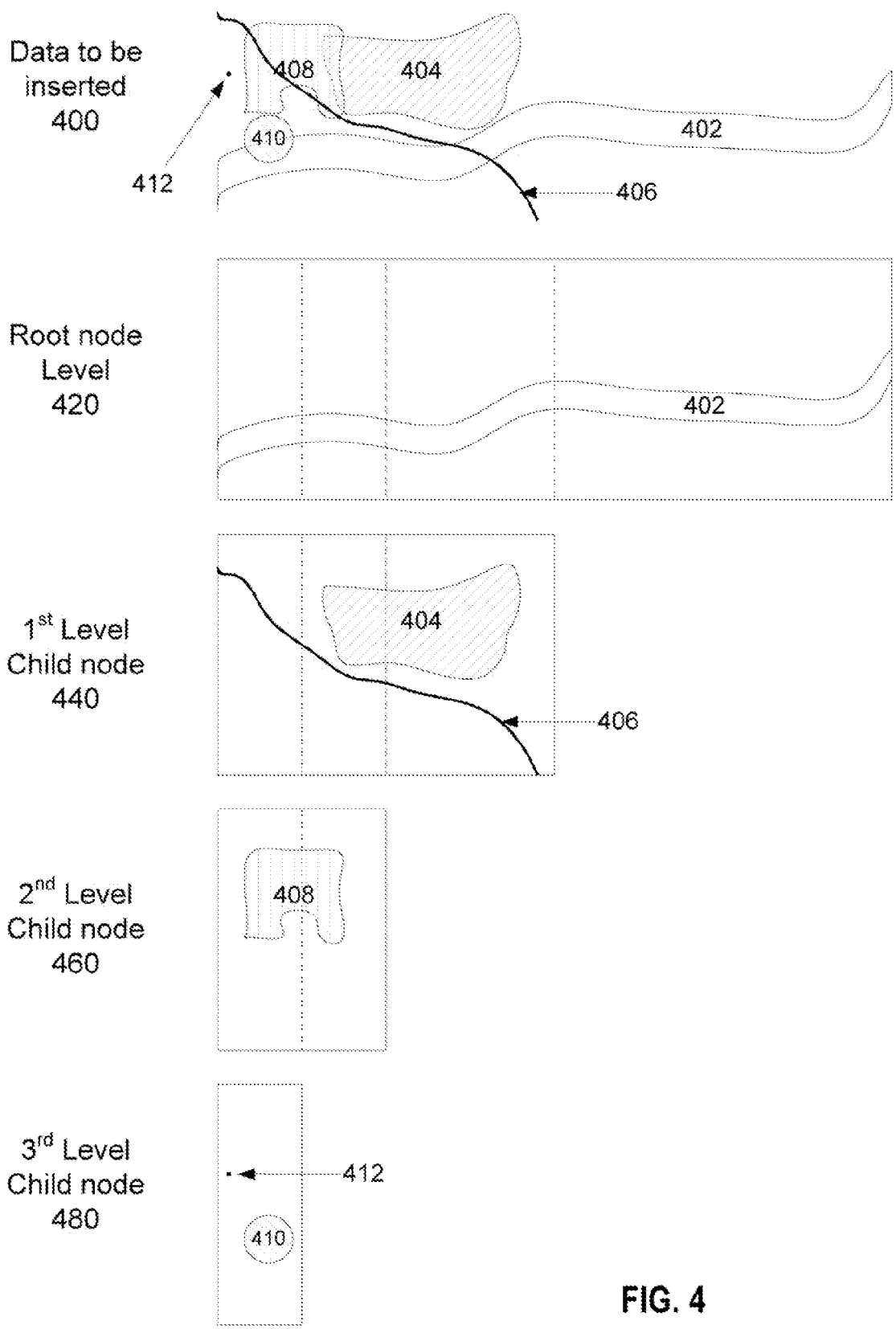
FIG. 4 shows single dimension and multidimensional data objects inserted into nodes of a sieve tree according to one embodiment of the invention.

FIG. 4 shows single dimension and multidimensional data objects 402-412 to be inserted 400 into nodes of a sieve tree according to one embodiment of the invention. A node "sieves" a geometry if the bounding object of the node intersects or contains the geometry and either the geometry cannot be translated in the coordinate space such that it could be contained by the bounding object of a child node or the bounding object of the node cannot be partitioned (e.g., the bounding object describes a point in the coordinate space or a limit to levels of child nodes has been reached). The determination of whether or not a node sieves a geometry is not predicated on the existence or inspection of child nodes since the bounding objects of all possible child nodes are trivially computable from the bounding object of the node.

In FIG. 4, data object 402 will lit in no node smaller than the root node, so the root node level. 420 sieves data object 402 and thus, data object 402 is stored at the root node level 420. Data objects 404 and 406 will wholly fit within the bounds of a first level child node 440, so they migrate down one level from the root node. Data objects 404 and 406 could not fit into a second level child node 460, so the first level child node 440 sieves data objects 404 and 406 and they stored in child node 440. Data object 408 will wholly fit within the bounds of a first level child node 440 and a second level child node 460 but it could not fit within the bounds of the third level child node 480, so data object 408 migrates down two levels from the root node where it is sieved and stored. Finally, data objects 410 and 412 follow the same pattern to migrate down to a third level child node 480.

In the example shown in FIG. 4, some data objects overlap (e.g., data object 404 and data object 408). In one embodiment, each data object is stored in its entirety despite the overlap—thus the common area shared by the two data objects is stored twice. In an alternative embodiment, data which overlaps (e.g., the area shared by data object 404 and data object 408) is not repeatedly stored with each object (e.g., the overlapped section is only stored with data object 404 and data object 408 as stored is reduced in size by the overlapping amount).

Although FIG. 4 shows only one child node per level, according to an embodiment of the invention, more than one child node is created by each partition (e.g., the $1^{st}$ child node level would show two child nodes of the root node). Additionally, FIG. 4 shows only a single partition per level, an embodiment of the invention will partition each child node more than once. In one embodiment, data objects may migrate down levels in such a manner as to have "empty" intermediate nodes (not shown in this example).

Figure 5:
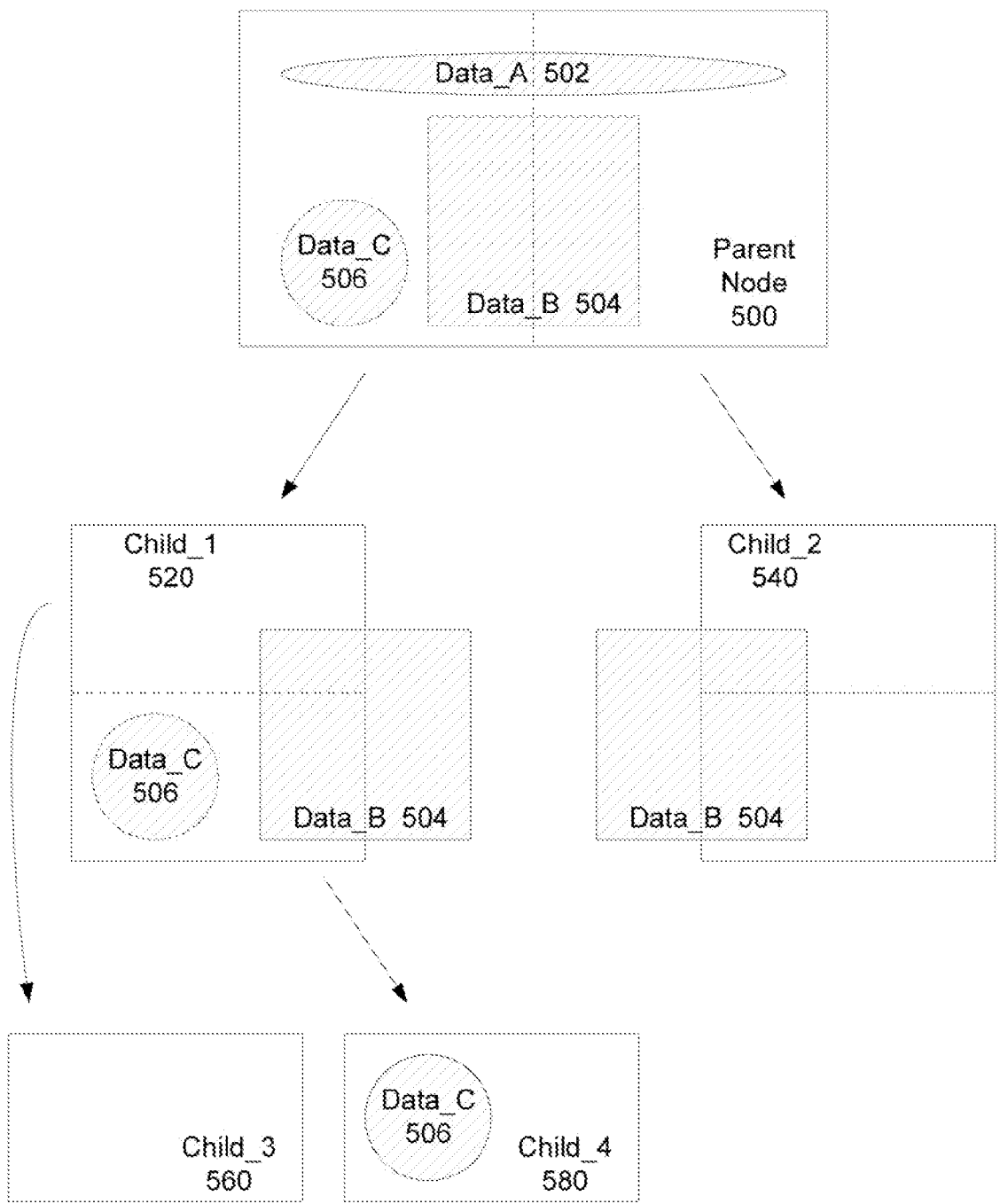
FIG. 5 shows multidimensional data objects inserted into nodes of a sieve tree when a data object overlaps more than one child node but could be wholly contained by a single child node if spatially translated according to one embodiment of the invention.

FIG. 5 shows multidimensional data objects Data_A, Data_B, and Data_C 502-506 inserted into nodes of a three-level sieve tree in which Data_B 504 overlaps more than one child node (Child_1 520 and Child_2 540) but could be wholly contained by a single child node if spatially translated. Data objects shown with a solid border indicate that the data objects are stored in that node/nodes, e.g., Data_A 502 stored in Parent Node 500. Data objects shown with a dashed border indicate the migration from parent nodes to child nodes, e.g., Data_C 506 migrated from Parent Node 500 down two levels through Child_1 520 to Child_4 580 where it was stored.

Parent Node 500 was partitioned and spawned child nodes Child_1 520 and Child_2 540 which each respectively represent the coordinate space on either side of the dashed division line in Parent Node 500. Data_A 502 was "sieved" because it cannot be translated in the coordinate space such that it would be wholly contained by either Child_1 520 or Child_2 540 and thus remains land stored) in Parent Node 500.

Data_C 506 can be wholly contained within a single child node of Parent Node 500, Child_1 520, (without translating it spatially) and was migrated to Child_1 520 from Parent Node 500. Child_1 520 was partitioned and spawns its own child nodes, Child_3 560 and Child_4 580. With Child_1 520 partitioned, Data_C 506 could be wholly contained in the resulting second level child node, Child_4 580, (again without translating it spatially) and Data_C 506 was migrated and stored there.

Data_B 504 could be wholly contained within a single child node, Child_1 520 or Child_2 540, if it was translated in coordinate space (e.g., along the x axis). However, Data_B 504 intersects with both Child_1 520 and Child_2 540 and therefore Data_B 504 was migrated (copied) to both Child_1 520 and Child_2 540 in the first level. Data_B 504 was then sieved at the first child node level because it could not fit within the bounds of a child node of the second child node level (e.g., Child_3 560 or Child_4 580) regardless of the location in coordinate space of Data_B 504.

In one embodiment, the spatial translation of a data object (for the determination of which level of nodes can wholly contain the data object) occurs along the axes of coordinate space without rotation of the data object. In another embodiment, the data object can he translated along any axis and/or rotated.

In FIG. 5, the nodes are partitioned in a uniform manner to create child nodes of equal size. Child nodes Child_1 520 and Child_2 540 are each ½ of Parent Node 500. At the next level, child nodes Child_3 560 and Child_4 580 arc each ½ of their parent node, Child_1 520. The sieve condition, in combination with the constraints on the definition of a node's bounding object, allows a number of important assertions to be made about the properties of the tree with respect to where and how geometries are stored.

According to an embodiment of the invention, for any n dimensional space (e.g., if n=2,2-dimensional space), there will be not more than $2^n$ nodes in the tree that sieve a geometry contained within that space and not more than $2^n$ nodes simultaneously storing a geometry. The set of all nodes in which a geometry may be stored is the union of all nodes in the root path of all the nodes that sieve the geometry inclusive, though as a practical matter only the subset of those nodes that exist need be considered for most purposes. An important consequence of a sieve condition is that it guarantees that along any coordinate axis, a geometry will only straddle a single partition line in the coordinate space.

Even though geometry decomposition (overlap of a data object across multiple node bounding objects and resulting copying in multiple nodes) is limited, any duplication creates a general requirement for queries to compare all logically adjacent nodes for duplicate geometries so only one copy of the geometry is returned as the result of a query. Comparing adjacent nodes may be expensive in terms of both bandwidth and computational resources. In one embodiment, this is resolved with edge overlap masking, which exploits an artifact of a sieve and partitioning function that inexpensively guarantees no duplicate geometries will be returned in the aggregate result set. A query may determine the existence of duplicate geometries when it is accessing adjacent nodes (e.g. via the sieve function). Therefore, as a query accesses those adjacent nodes, it may choose to exclude all geometries that overlap the shared side in one of the adjacent nodes. In an embodiment, a query masks an overlapped side following the same pattern throughout the data structure, e.g., always masking the high side along every coordinate axis in a node when there is an adjacency. In an alternative embodiment, an edge overlap masking flag is set indicating the node edge it overlaps when data is duplicated and inserted into more than one node in the tree. When the query accesses a set of nodes with a shared edge, the flag will indicate geometries that are duplicated in the scope of the query and which are not to be returned from one of the nodes that shares the edge. Point geometries are not decomposable across node boundaries, so there will not be duplicate point geometries.

In one embodiment, because a geometry is qualified for a node based on its bounding object, it is possible when a geometry is copied to multiple nodes that the underlying geometry does not actually intersect a node into which it is inserted (e.g., a simple, rectangular bounding object is used for a different shape geometry). Creation of these phantom records should be rare in the vast majority of cases, since it is the compound probability of multiple low probability conditions. Without edge overlap masking, it is safe to not store phantom records with the caveat that the condition that creates phantom records also creates correct duplication. Alternatively, phantom records are flagged and conditionally ignored when using edge overlap masking. In one embodiment, a search and retrieval function based upon a selected coordinate region that returns a phantom record requires a second test (using the coordinates of the geometry rather than a bounding box) to determine if that record does not actually exist in that coordinate region.

In one embodiment of the invention, a partitioning function is applied to the bounding object of a node to create the bounding objects of a node's child nodes. For each new bounding object created by the partitioning function, a corresponding child node is spawned using that partition as the child node's bounding object. In an embodiment, of the invention, the partitioning function is repeatable such that a given bounding object always produces the same number and relative location of partitions when the partitioning function is applied to it. This constraint guarantees that for any geometry contained within the defined coordinate space, it is possible to trivially compute the complete set of bounding objects for nodes in which the geometry may be stored from the bounding object of the geometry and the bounding object of the root node. It is not required that every bounding object be able to be partitioned (e.g., if the bound object describes a point in the coordinate space or a limit of child node levels has been reached). In an additional embodiment, the partitioning function creates a number of similarly sized bounding objects that is an integer power of two ($2^n$).

In one embodiment a binary partitioning function is used to control the level of child fanout. There are advantages to both very low fanout (two being the minimum) and very high fanout. A minimal fanout may substantially improve average node utilization and a high fanout may substantially improve the amount of parallelism and concurrency.

A node may spawn child nodes, if the bounding object of the node can be partitioned, based on a set of threshold conditions. Exemplary threshold conditions include the number of non-sieved geometries stored in the node, as geometries would be migrated to the child nodes in the event that they are spawned, an increased computational resource capacity that encourages greater distribution of the data, etc. The parent node maintains direct references to the child nodes but that may not be necessary if the address of the child node can be looked up, via an associative array or multimap using nothing more than its bounding object which is computed from the bounding object of the parent node and a constrained partitioning function as described above.

According to an embodiment of the invention, a sieve tree is not a balanced tree, since balancing the tree severely reduces concurrent update scalability in spatial data structures. This does not imply that the page access cost is highly variable depending on the distribution of geometries in the data set; the content-addressability of individual nodes in a sieve tree replaces the roughly O(log n) or O(n log n) access cost of balanced trees with something closer to the O(I) of an associative array ("O" refers to big O notation which is used to describe how the size of the input data affects computational resources such as running time and memory). Therefore, a sieve tree retains most of the theoretical advantages of a balanced tree without inheriting the poor update concurrency of balanced trees.

Search, insertion, and deletion operations using a sieve tree structure are implemented using simple recursive procedures that are similar to those used for many conventional tree structures. An important difference between a sieve tree and some other tree structures is that operations on specific geometries may require recursing multiple branches of the tree. For example, insertion of a geometry in an n-dimensional space may require as many as $2^n$ insertions by recursing logically adjacent node paths. On the other hand, unlike some current tree structures, searching for every instance of that geometry requires following not more than a constant $2^n$ branches; R-trees only store a single copy, but due to node overlap a large number of branches may need, to be searched to find that copy.

Figure 6:
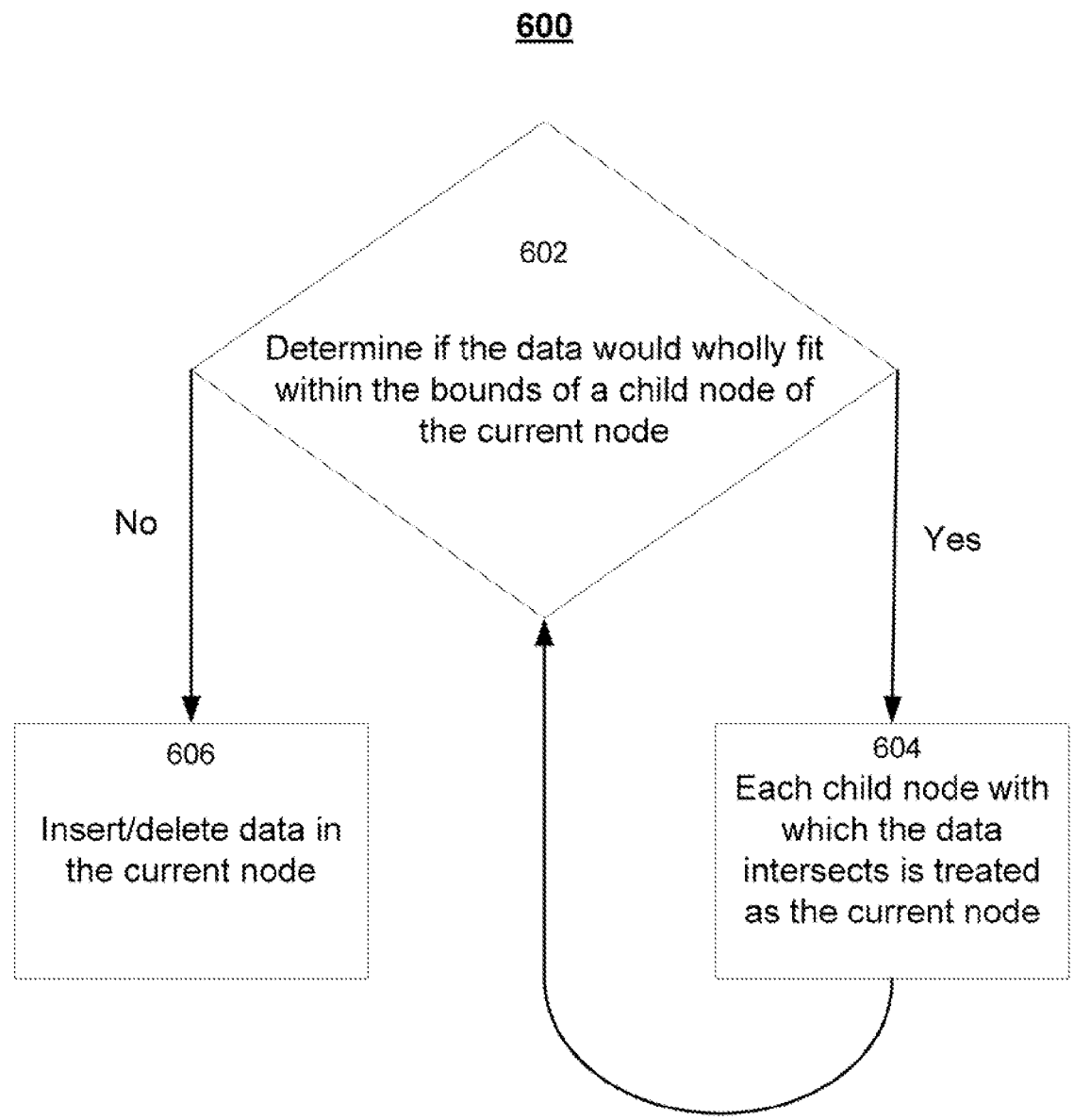
FIG. 6 is a flow chart that shows the insertion/deletion of a data object into/from a sieve tree according to one embodiment of the invention.

FIG. 6 is a flow chart illustrating an embodiment of a method 600 for the insertion/deletion of a data object into/from a sieve tree by recursing through the sieve tree front the root node. Insertion appends a geometry/data object contained by the sieve tree's coordinate space to the node(s) that store it. Starting at the root node and recursively working down the levels of the sieve tree, a determination whether one or more child nodes exist or can be created that intersect the geometry and could wholly contain the geometry regardless of the data object's location in coordinate space is made at block 602. If so, each child node with which the data intersects is treated as the current node at block 604 and the process is repeated. When no child node exists/can be created or the geometry cannot fit in the (next) child node level (i.e., is sieved), the geometry is stored in the current node at block 606.

Deletion removes a geometry contained by the sieve tree's coordinate space from the node(s) that store it and follows a similar process as described above. Starting at the root node and recursively working down the levels of the sieve tree, a determination is made whether one or more child nodes exist that intersect the geometry (to be deleted) and could wholly contain the geometry regardless of the data object's location in coordinate space at block 602. If so, each child node with which the data intersects is treated as the current node at block 604 and the process is repeated. When no child node exists or the geometry could not fit in the (next) child node level, the geometry, if stored in the current node, is deleted at block 606.

Referring to FIG. 5, a data object of the same size as Data_C 506 that existed in coordinate space above (along the y-axis) Data_C 506 would follow the insertion method described in FIG. 6 to be inserted as follows. Starting at the root node, a determination if the new data object could fit, regardless of its location in coordinate space, within the bounds of a Child_1 520 would be performed. The new data object would only intersect with Child_1 520, so Child_1 520 will be treated as the new current node. Another determination is made to determine if the new data object could fit, regardless of its location in coordinate space, within the bounds of a Child_3 560. For the purpose of this example, the new data object, would only intersect, with Child_3 560, so Child_3 560 will be treated as the new current node and the method repeats itself again. Because there are no more child nodes below the current node, Child_3 560, the data is stored in Child_3 560. In other embodiments, Child_3 560 is partitioned to spawn child nodes in the manner described above and the recursive process continues.

Figure 7:
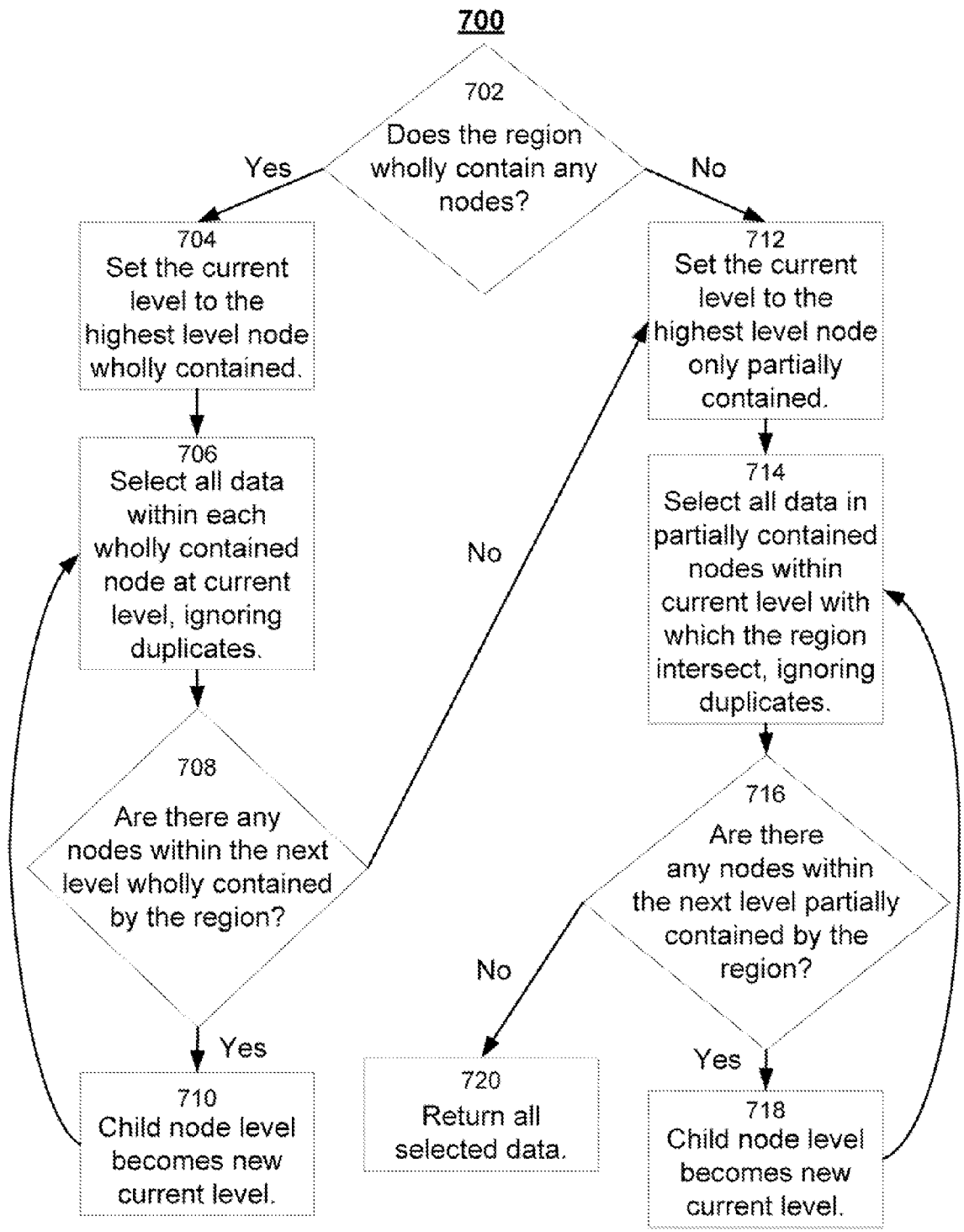
FIG. 7 is a flow chart that shows the selection of data objects resulting from a search of a sieve tree based upon region intersection according to one embodiment of the invention.

FIG. 7 is a flow chart illustrating method 700 for the selection of data objects resulting from a search, of a sieve tree based upon region intersection by recursing the sieve tree from the root node. Intersection-qualified selection selects the set of all geometries/data objects that intersect a "region" geometry. Starting at the root node and recursively working down the levels of the tree, a determination if the region wholly contains any nodes is made at block 702. The highest level of nodes wholly contained is set to be the first current level at block 704. All data within each wholly contained node is selected and duplicates are ignored at block 706. It is determined if there are any child nodes of the wholly contained nodes at the current level at block 708. If so, the child node level becomes the current level at block 710 and the process is repeated. If there is no more data in subsequent child levels, no more child levels, or the region does not wholly contain any nodes, the process continues by setting the current level to the highest level of nodes that are partially contained by the region at block 712. All data within the new current level that is intersected by the region is selected and duplicates are ignored at block 714. It is determined if there are any child nodes within the next (child) level with which the region intersects at block 716. If so, the child node level becomes the new current level at block 718 and the process is repeated. When no (more) data intersected by the region exists below the current level of partially contained nodes, all data that has been selected from wholly contained and partially contained nodes is returned at block 720. Other elementary operations are implemented as combinations and/or trivial modifications of the described operations.

For n-dimensional tree of depth "h," which may only contain a subset of the nodes in which a geometry may be stored if the depth was unbounded, the lower and upper bound on the size of the set of nodes in which a geometry may be stored is h and $(h-1)(2^n)+1$ respectively. Since a linear increase in node depth is roughly proportional to the logarithm of the total number of geometries in the tree, it follows that even for extremely large data sets there will not be more than a few dozen qualified nodes when there is a reasonable average load factor for the individual nodes. As a result, an embodiment of the invention is used as a spatial equivalent of a linear hash table.

According to an embodiment of the invention, a sieve tree is treated as an associative array or a multimap, with the bounding box of the node acting as the "key" (e.g., bounding boxes are reduced to scalars). This has an extremely powerful consequence when combined with a fixed coordinate space, invariant space decomposition function, and sieve behavior: for any geometry, it is trivial to compute the "key" of the set of nodes that may contain it. Because locks never propagate toward the root node, there are never adverse consequences to directly accessing particular nodes in a tree rather than recursing the tree from the root node. Use of this representation of the free trivially extends a simple tree implementation to a massively distributed implementation with very high update concurrency.

Treating a sieve tree as an associative array or a multimap exposes both location and size relationships and allows searches to simultaneously qualify the region of interest and the size of the geometries of interest while conventional spatial access methods only qualify the region. This allows queries to potentially bypass an extremely large set of unqualified geometries that would typically require geometry comparisons in most conventional data structures.

One advantage of the described sieve tree is that while every node is content-addressable, that fact does not need to be fully exploited or even partially exploited since the tree is accessed as purely a tree-like data structure—recursively from root to leaf. For example, one implementation policy uses an associative cache that takes advantage of content-addressability for only the most frequently accessed nodes and has queries recurse the tree from the closest cache entry to the node of interest. This makes a sieve tree amenable to a number of decentralized, hardware-accelerated routing protocol implementations.

In one embodiment of the invention, the organization of geometries in a node is application specific. Because the set of geometries in a node will have relatively low selectivity for many queries, further organization based on spatial properties is very likely inefficient in most eases. Conceptually, each node is viewed as an independent database where the geometry values have a relatively high probability of overlapping each other.

In many cases, it is not optimal to organise dissimilar types in the same "space" due to the potential for extremely asymmetric distributions along the different axes, at least not without a partitioning function designed to compensate for asymmetries. However, an embodiment of the invention utilizes composite keys with unrelated axes. For example, instead of indexing a data object in 2-dimensional space plus time as a single 3-dimensional spatial key, the data object is indexed as 2-dimensional spatial key composited with a 1-dimensional spatial key.

An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network.

Figure 8:
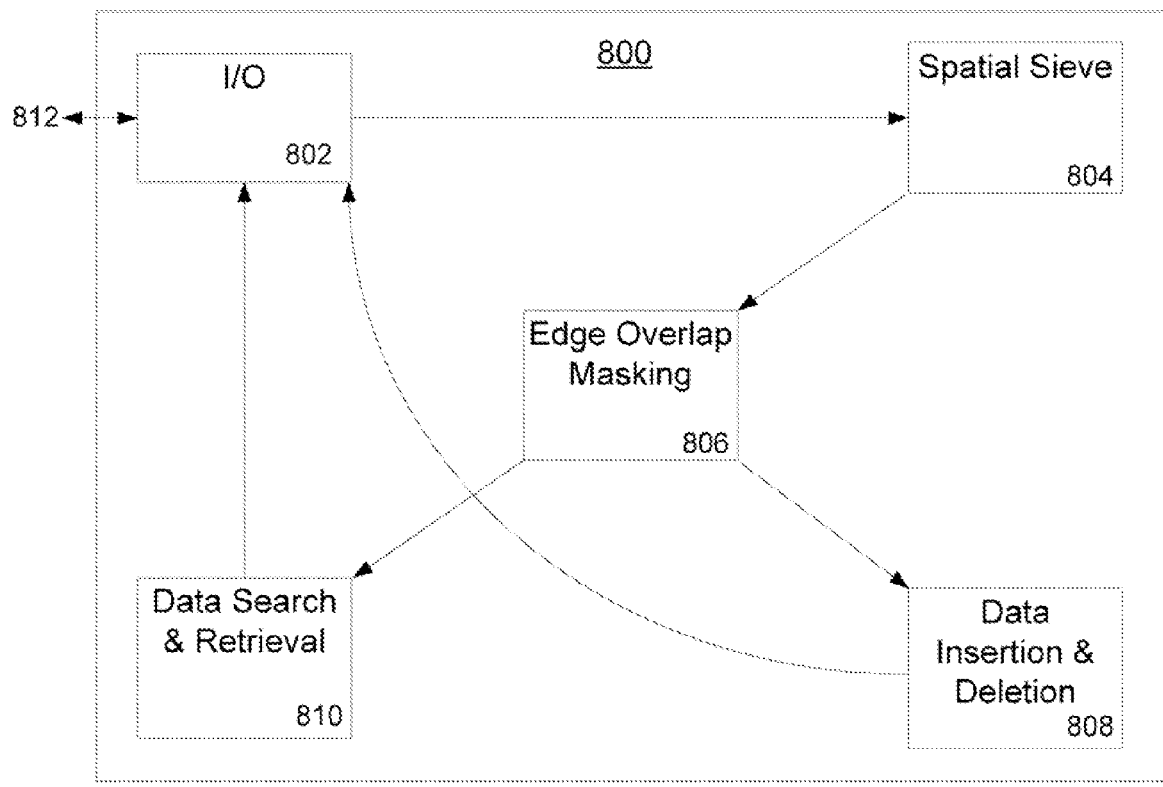
FIG. 8 is a block diagram for storing, managing, and manipulating multidimensional data in a sieve tree according to one embodiment of the invention.

FIG. 8 is a block diagram for storing, managing, and manipulating multidimensional data in a sieve tree according to one embodiment of the invention. This block diagram represents an FPGA, an ASIC, software modules which provide the required functionality, or a combination thereof. Modules for; 1) I/O 802; 2) Spatial Sieve 804; 3) Edge Overlap Masking 806; 4) Data insertion and Deletion 808; and 5) Data Search and Retrieval 810 are illustrated.

I/O module 802 sends and receives data objects, queries, and other instructions related to storing, managing, and manipulating data within a tree to and from an external storage device 812 (not shown).

Spatial sieve module 804 determines which level of the tree has the smallest size node in which a data object could wholly fit regardless of the data object's location in coordinate space for: inserting the object into the tree, deleting the object from the tree, or searching for an object within the tree. In one embodiment, the spatial sieve module 804 provides the path to be navigated within the tree to the node corresponding to a data object to be inserted, deleted, retrieved, etc.

Edge overlap masking module 806 determines, based upon the data object's location in coordinate space and smallest size node in which the data would wholly fit regardless of the data's location in coordinate space, that multiple copies of the data have been inserted into a plurality of child nodes due to boundary overlap. In one embodiment, the edge overlap masking module 806 utilizes the spatial sieve module 804 for part or all of this determination. Once it has been determined that multiple copies of a data object exist within the tree, the edge overlap mask module 806 masks duplicate copies for the result of a search or query (i.e. duplicates are ignored when sent via the I/O module 802). In another embodiment, the edge overlap masking module is not used in some or all functions and is bypassed.

Data insertion, and deletion module 808 instructs, via I/O module 802, a storage device 812 to store or delete the data object in one or more nodes of the level determined by spatial sieve module 804 that at least partially contain the data object based on the bounds of the one or more nodes and the location of the object in coordinate space. In an embodiment, data insertion and deletion module 808 is used for the creation of a root node as well as spawning child nodes according to an embodiment described above.

Data search and retrieval module 810 performs searches within the tree and retrieves the corresponding data according to an embodiment of the invention described above. In an embodiment, a data object within the tree is located by utilizing the determined level from the spatial sieve module 804 combined with the location of the data in coordinate space and recursively searching down the tree from the root node to the node(s) in question or utilizing a multimap to represent part or all of the tree as described above. Duplicates identified by the edge overlap masking module 806 are ignored.

Figure 9:
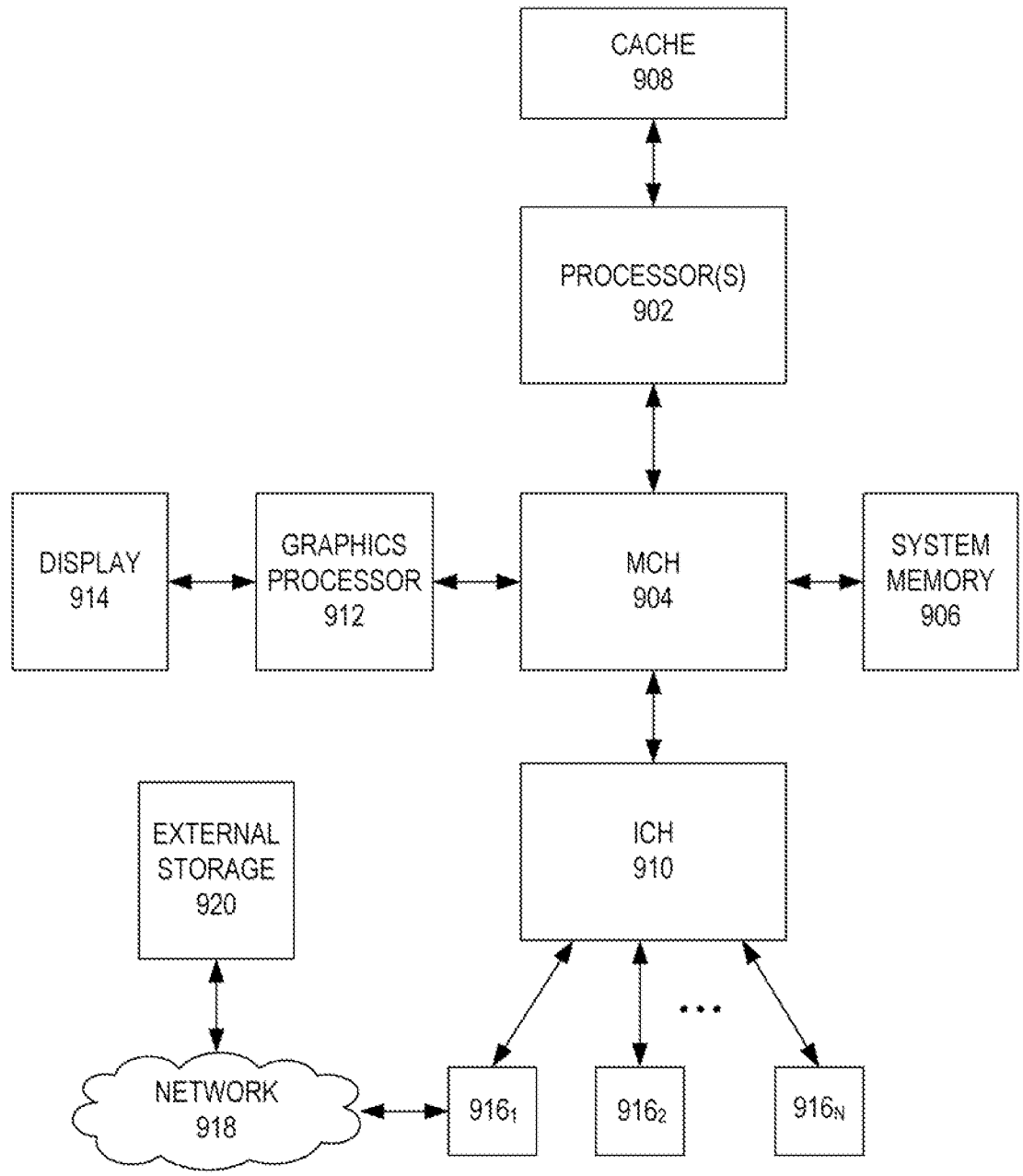
FIG. 9 is a block diagram of an apparatus and system for storing, managing, and manipulating multidimensional data in a sieve tree according to one embodiment of the invention.

FIG. 9 shows an apparatus and computing system (e.g., a computer and networked external storage) such as what would constitute an apparatus capable of implementing an embodiment of the invention. The exemplary computing system of FIG. 9 includes: 1) one or more processors 902: 2) a memory control hub (MCH) 904; 3) a system memory 906 (of which different types exist such as DDR RAM, EDO RAM, etc,); 4) a cache 908; 5) an I/O control hub (ICH) 910; 6) a graphics processor 912; 7) a display/screen 914 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 916.

The one or more processors 902 execute instructions in order to perform whatever software routines the computing system implements. The instructions frequently involve some sort of operation performed upon data. Both data and instructions are stored in system memory 906 and cache 908. Cache 908 is typically designed to have shorter latency times than system memory 906. For example, cache 908 might be integrated onto the same silicon chip(s) as the processor(s) and/or constructed with faster SRAM cells whilst system memory 906 might be constructed with slower DRAM cells. By tending to store more frequently used instructions and data in the cache 908 as opposed to the system memory 906, the overall performance efficiency of the computing system improves.

System memory 906 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 906 prior to their being operated upon by the one or more processor(s) 902 in the implementation of a software program. Similarly, data that a software program determines should be sent from the computing system to an outside entity through one of the computing system interfaces, or stored into an internal storage element, is often temporarily queued in system memory 906 prior to its being transmitted or stored. The system memory 906 may include one or more modifies to provide the functionality described above including, but not limited to, modules for: creating a tree, spawning nodes, a sieve function, data insertion, edge overlap masking, data search, data deletion, etc. These modules may also be stored on articles of manufacture and executed at runtime by the computing system.

The ICH 910 is responsible for ensuring that such data is properly passed between the system memory 906 and its appropriate corresponding computing system interface (and internal storage device if the computing system is so designed). In an alternate embodiment, system memory 906 is coupled directly with processor(s) 902. The MCH 904 is responsible for managing the various contending requests for system memory 906 access amongst the processor(s) 902, interfaces and internal storage elements that may proximately arise in time with respect to one another.

One or more I/O devices 916 are also implemented in a typical computing system. I/O devices generally are responsible for transferring data to and/or from the computing system (e.g., a networking adapter); or, for large scale non-volatile storage within the computing system (e.g., hard disk drive). ICH 910 has bi-directional point-to-point links between itself and the observed I/O devices 916.

Network 918 connects the processors) 902 with external storage 920 via MCH 904. ICH 910, and an I/O device 916.

As the scale of data objects to be stored and manipulated can be extremely large, external storage will distribute the load over one or more devices.

In one embodiment, a sieve tree is stored in system memory 906. In alternative embodiments, a sieve tree is stored in non-volatile storage (e.g., a hard disk drive) 916 or external storage 920.

In the foregoing specification, the invention has been described with reference to specific exemplary embodiments thereof. It will be evident that various modifications may be made thereto without departing from the broader spirit and scope of the invention. Modules and components of hardware implementations can be omitted or combined without significantly altering embodiments of the invention. The specification and drawings are, accordingly, to be regarded in an illustrative sense rather than a restrictive sense.

What is claimed is:

1. A machine readable medium having executable instructions to cause a machine to perform a method comprising:
   creating a multi-level, multidimensional tree, including a root node with defined bounds;
   partitioning the bounds of the root node of the tree;
   creating, at a level in the tree below the level of the root node, a plurality of child nodes, wherein each child node has defined bounds associated with a partitioned portion of the root node and which may be further partitioned into additional levels of child nodes, and each level of the tree below the root node level containing successively smaller nodes;
   determining which level of the tree has the smallest size node in which a data object could wholly fit, wherein the data object is not wholly contained by one node of the determined level but would be wholly contained by one node if the data object was translated in coordinate space; and
   storing the data object in two or more nodes of the determined level that at least partially contain the data object based on the bounds of the two or more nodes.

2. The machine readable medium of claim 1 wherein the data is multidimensional.

3. The machine readable medium of claim 1 wherein the total number of levels is limited to a predetermined number.

4. The machine readable medium of claim 1 wherein the total number of partitions of a node is limited to a predetermined number.

5. The machine readable medium of claim 1 wherein the nodes are partitioned uniformly.

6. The machine readable medium of claim 1 wherein the bounds of child nodes are equal in size at each level.

7. The machine readable medium of claim 1 wherein the nodes of the same level do not overlap.

8. The machine readable medium of claim 1 wherein the tree is based upon the structure of a Quad-Tree.

9. The machine readable medium of claim 1 wherein the tree is based upon the structure of a KD-Tree.

10. The machine readable medium of claim 1 wherein the tree is represented by a multimap.

11. The machine readable medium of claim 1 wherein a portion of the tree is represented by a multimap.

12. The machine readable medium of claim 11 wherein determining which level of the tree has the smallest size node in which a data object could wholly fit comprises:
    treating the root node as a current node;
    determining that the data object would wholly fit within a child node of the current node;
    determining which one or more child nodes of the current node at least partially contain the data object; and
    recursively treating each of the one or more child nodes that at least partially contain the data object as the current node until reaching a level for which the data object will not wholly fit within a child node even if translated in coordinate space.

13. The machine readable medium of claim 1 further comprising:
    receiving a query for a data object;
    determining, based upon the data object's location in coordinate space and smallest size node in which the data would wholly fit if the data object was translated in coordinate space, that multiple copies of the data have been inserted into a plurality of child nodes; and
    masking duplicate copies of the data.

14. An apparatus comprising:
    an input and output module for receiving and sending one or more data objects and data object instructions;
    a node creation module for creating a multi-level, multidimensional tree to store the one or more data objects, including a root node with defined bounds,
        wherein the node creation module partitions the bounds of the root node of the tree and creates, at a level in the tree below the level of the root node, a plurality of child nodes, wherein each child node has defined bounds associated with a partitioned portion of the root node and which may be further partitioned into additional levels of child nodes, and each level of the tree below the root node level containing successively smaller nodes;
    a spatial sieve module for determining which level of the tree has the smallest size node in which a data object could wholly fit, wherein the data object is not wholly contained by one node of the determined level but would be wholly contained by one node if the data object was translated in coordinate space; and
    a data insertion module for instructing a storage device to store the data object in two or more nodes of the determined level that at least partially contain the data object based on the bounds of the two or more nodes.

15. The apparatus of claim 14, wherein a portion of the tree is represented by a multimap and wherein determining which level of the tree has the smallest size node in which a data object could wholly fit comprises:
    treating the root node as a current node;
    determining that the data object would wholly fit within a child node of the current node; and
    determining which one or more child nodes of the current node at least partially contain the data object; and
    recursively treating each of the one or more child nodes that at least partially contain the data object as the current node until reaching a level for which the data object will not wholly fit within a child node even if translated in coordinate space.

16. The apparatus of claim 14, wherein the input and output module receives a query for a data object and the spatial sieve module determines, based upon the data object's location in coordinate space and smallest size node in which the data would wholly fit if the data object was translated in coordinate space, that multiple copies of the data have been inserted into a plurality of child nodes further comprising:
    an edge overlap masking module for masking duplicate copies of the data object.

17. An apparatus comprising:
    a processor; and
    a memory coupled to the processor to store instructions to cause the processor to:

create a multi-level, multidimensional tree, including a root node with defined bounds;

partition the bounds of the root node of the tree;

create, at a level in the tree below the level of the root node, a plurality of child nodes, wherein each child node has defined bounds associated with a partitioned portion of the root node and which may be further partitioned into additional levels of child nodes, and each level of the tree below the root node level containing successively smaller nodes;

determine which level of the tree has the smallest size node in which a data object could wholly fit, wherein the data object is not wholly contained by one node of the determined level but would be wholly contained by one node if the data object was translated in coordinate space; and store the data object in two or more nodes of the determined level that at least partially contain the data object based on the bounds of the two or more nodes.

18. The apparatus of claim 17 wherein the memory further stores instructions to cause the processor to:

represent a portion of the tree with a multimap and wherein determining which level of the tree has the smallest size node in which a data object could wholly fit comprises treating the root node as a current node;

determining that the data object would wholly fit within a child node of the current node; and determining which one or more child nodes of the current node at least partially contain the data object; and recursively treating each of the one or more child nodes that at least partially contain the data object as the current node until reaching a level for which the data object will not wholly fit within a child node even if translated in coordinate space.

19. The apparatus of claim 17 wherein the processor receives a query for a data object and the memory further stores instructions to cause the processor to:

determine, based upon the data object's location in coordinate space and smallest size node in which the data would wholly fit if the data object was translated in coordinate space, that multiple copies of the data have been inserted into a plurality of child nodes; and mask duplicate copies of the data object.

20. A system comprising:

a processor;

a storage device to store a multidimensional, multi-level tree;

a network coupled between the processor and the storage device; and a memory coupled to the processor to store instructions to cause the processor to create a multi-level, multidimensional tree, including a root node with defined bounds;

partition the bounds of the root node of the tree;

create, at a level in the tree below the level of the root node, a plurality of child nodes, wherein each child node has defined bounds associated with a partitioned portion of the root node and which may be further partitioned into additional levels of child nodes, and each level of the tree below the root node level containing successively smaller nodes;

determine which level of the tree has the smallest size node in which a data object could wholly fit, wherein the data object is not wholly contained by one node of the determined level but would be wholly contained by one node if the data object was translated in coordinate space; and store the data object in two or more nodes of the determined level that at least partially contain the data object based on the bounds of the two or more nodes.

21. The system of claim 20 wherein the memory further stores instructions to cause the processor to:

represent a portion of the tree with a multimap and wherein determining which level of the tree has the smallest size node in which a data object could wholly fit comprises treating the root node as a current node;

determining that the data object would wholly fit within a child node of the current node; and determining which one or more child nodes of the current node at least partially contain the data object; and recursively treating each of the one or more child nodes that at least partially contain the data object as the current node until reaching a level for which the data object will not wholly fit within a child node even if translated in coordinate space.

22. The system of claim 20 wherein the processor receives a query for a data object and the memory further stores instructions to cause the processor to:

determine, based upon the data object's location in coordinate space and smallest size node in which the data would wholly fit if the data object was translated in coordinate space, that multiple copies of the data have been inserted into a plurality of child nodes; and mask duplicate copies of the data object.

* * * * *